Nov. 11, 1969   J. J. FESCO   3,477,209
FILTER BAG
Filed Nov. 29, 1965   2 Sheets-Sheet 1
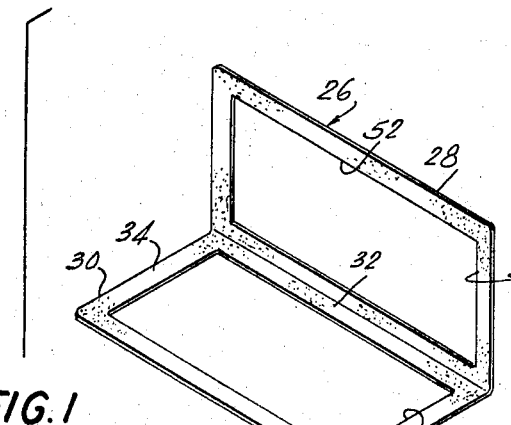
FIG. 1
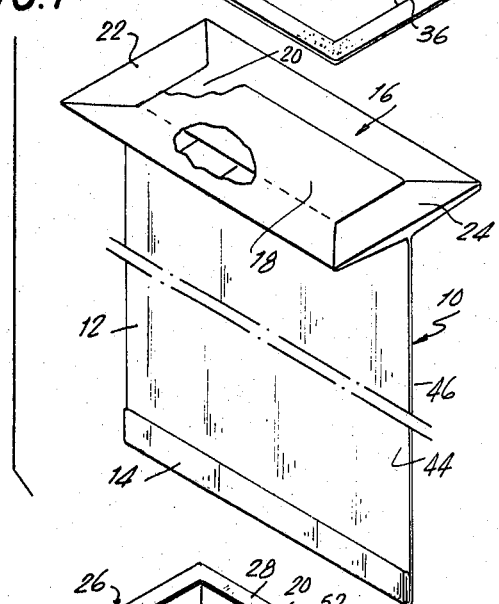
FIG. 2
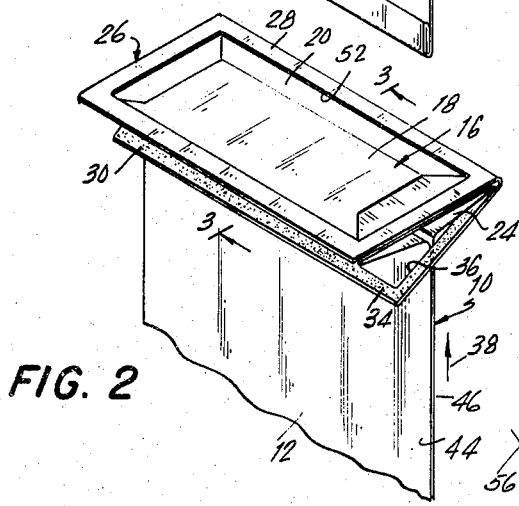
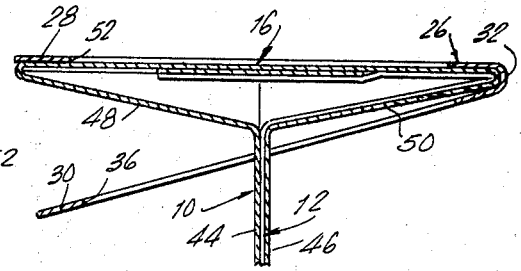
FIG. 3
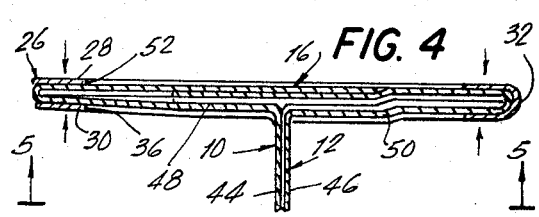
FIG. 4
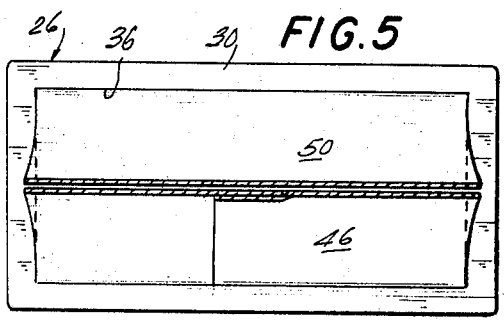
FIG. 5
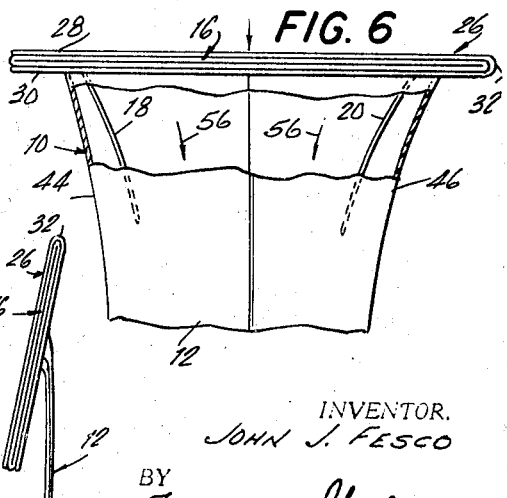
FIG. 6
FIG. 6a
INVENTOR.
JOHN J. FESCO
BY Friedman & Goodman
ATTORNEYS

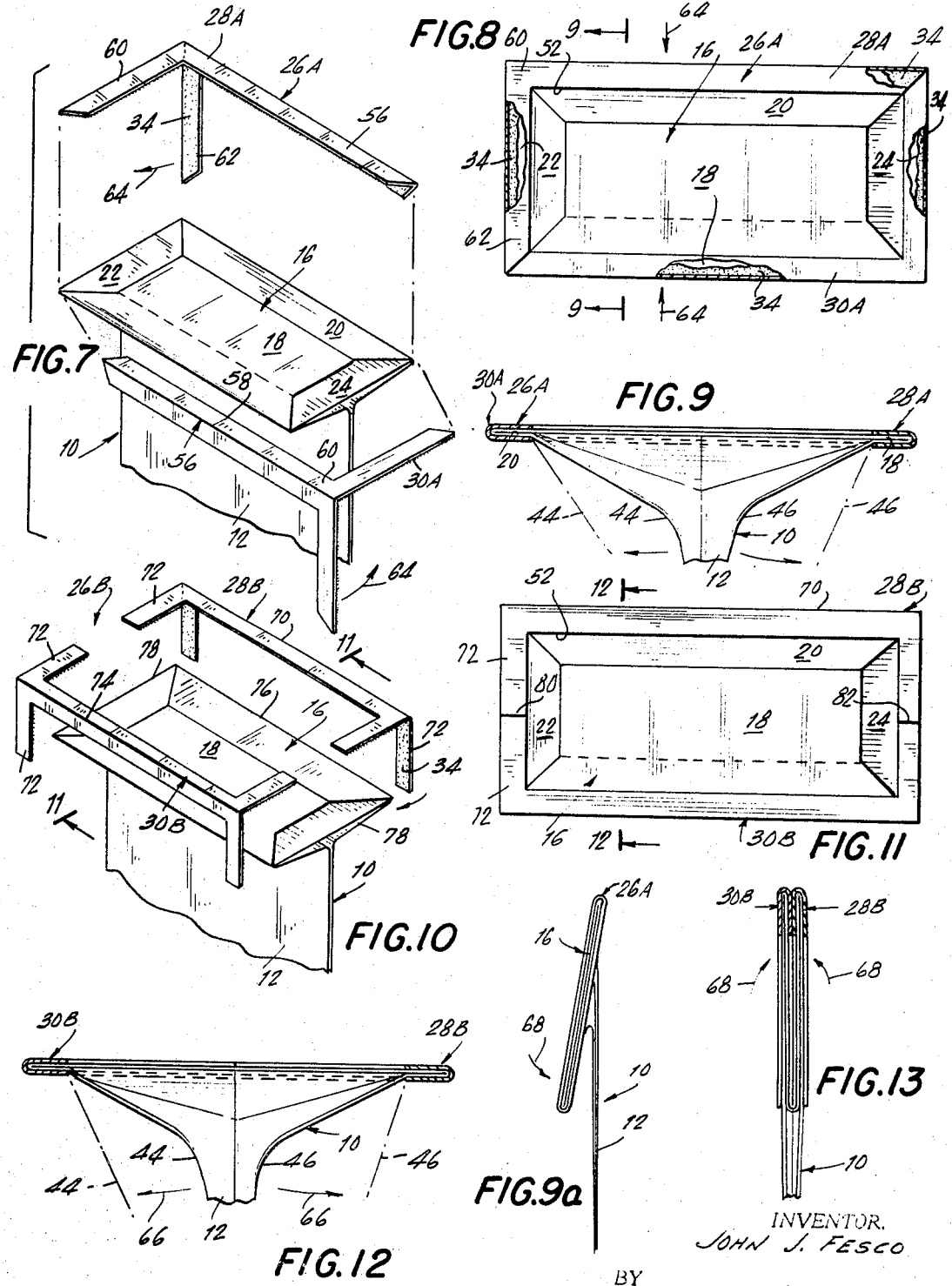

United States Patent Office 3,477,209
Patented Nov. 11, 1969

3,477,209
FILTER BAG
John J. Fesco, Baldwin, N.Y., assignor to Studley Paper Company, Inc., a corporation of New York
Filed Nov. 29, 1965, Ser. No. 510,178
Int. Cl. B01d 29/10
U.S. Cl. 55—367
3 Claims The present invention relates to an improved filter bag especially intended for use in connection with vacuum cleaners and to a method for fabricating such a bag.

It is an object of the present invention to provide a vacuum cleaner filter bag having a highly novel and efficient collar provided thereon.

It is another object of the present invention to provide a highly novel and simplified method for providing collars on vacuum cleaner filter bags.

It is a further object of the present invention to provide a vacuum cleaner filter bag of generally simplified collar construction which will have a long and efficient life.

It is a still further object of the present invention to provide a vacuum cleaner filter bag which can be economically manufactured at a relatively low cost in a generally simplified manner.

Other and further objects and advantages of the present invention will be readily apparent to one skilled in the art from a consideration of the following specification taken in connection with the appended drawings.

In the drawings, which illusrate the best modes presently contemplated for carrying out the invention, FIGURE 1 is an exploded view illustrating the assembly of a bag and collar pursuant to the present invention;

FIGURE 2 is a perspective view which illustrates another step in the assembly of a bag and collar pursuant to the present invention;

FIGURE 3 is a sectional view on an enlarged scale taken on the line 3—3 of FIGURE 2;

FIGURE 4 is a view similar to FIGURE 3 and illustrates the bag and collar in the fully assembled condition thereof;

FIGURE 5 is a sectional view taken on the line 5—5 of FIGURE 4;

FIGURE 6 is a view in elevation of a bag and collar pursuant to the present invention when subjected to the vacuum action of a vacuum cleaner;

FIGURE 6A is a fragmentary view of the bag and collar pursuant to the present invention and illustrates the folding of the end portion of the bag against the body thereof;

FIGURE 7 is an exploded view of a bag and collar pursuant to the present invention and illustrates a modified form of collar;

FIGURE 8 is a plan view of a bag provided with a collar pursuant to FIGURE 7;

FIGURE 9 is a sectional view taken on the line 9—9 of FIGURE 8;

FIGURE 9A is a fragmentary view of the bag illustrated in FIGURE 9 with the end thereof inclosed or folded condition;

FIGURE 10 is a view similar to FIGURE 7 and illustrates another modified form of collar;

FIGURE 11 is a plan view of the bag illustrated in FIGURE 10 with the collar assembled thereon;

FIGURE 12 is a sectional view taken through the line 12—12 of FIGURE 11; and

FIGURE 13 is a view illustrating the collar shown in FIGURES 10, 12 folded upon itself.

Referring now FIGURES 1 through 6A of the drawings in detail, there is shown a conventional square bottom bag 10. Bag 10 is of the general type illustrated and described in U.S. Patent No. 2,792,076, dated May 14, 1957, and issued to C. E. Meyerhoefer. The bag 10 is formed of air pervious sheet material preferably air pervious filter paper for use in a vacuum cleaner. As here shown, the bag 10 is provided with a body portion 12 which is closed at one end thereof by a folded over seal 14. The rectangular bag bottom is generally indicated by the reference numeral 16. The bag bottom 16 is of conventional construction and is constituted as here shown by four flaps 18, 20, 22 and 24. In a conventional square bottom bag, these flaps are sealed together so as to close the bag bottom 16. However, for use as a vacuum cleaner filter bag, the flaps 18, 20, 22 and 24 of the rectangular bag bottom 10 are left unsealed or unsecured to each other.

In accordance with the present invention, the bag bottom 16 is provided with a hinged rectangular collar 26. As here shown, the hinged rectangular collar means 26 is constituted by a first rectangular collar segment 28 and by a second rectangular collar segment 30 which are preferaby in integral hinged relation along the hinged line 32. The confronting or inner surfaces of the collar segments 28 and 30 are provided with a suitable adhesive coating generally indicated by the reference numeral 34.

In forming the vacuum cleaner filter bag 10, the rectangular collar means 26 is first spread apart as illustrated in FIGURE 1. Thereafter, the bag end or bag bottom 16 is drawn through the opening 36 in the collar segement 30 as illustrated in FIGURE 2 so that the bag bottom is disposed between the collar segments 28 and 30. This may readily be accomplished by maneuvering the bag bottom 16 upwardly through the collar opening 36 as indicated by the arrow 38 in FIGURE 2. The bag bottom or bag end 16 inserted or extended through the bottom collar segement 30 so as to be disposed between the two collar segments 28 and 30. It will be noted that the bag body 12 extends downwardly through the opening 36 in the collar segment 30. The two collar segments 28 and 30 are then brought together as indicated by the arrows 40 and 42 in FIGURE 4. Since the inner surfaces or the confronting surfaces of the collar segments 28 and 30 are coated with the adhesive 34, it will be apparent that the collar 26 is secured in overlying relation about the upper and lower peripheries of the bag bottom or bag end 16. As best shown in FIGURE 4, the collar segment 28 is uppermost and overlies the bag flaps 18, 20, 22 and 24, and the collar segment 30 is disposed beneath the bag end 16. Further, it will be noted that the bag body 12 extends downwardly through the opening 36 in the collar segment 30. It will be noted that the bag body 12 is provided with opposing side walls 44 and 46 which extend into the bag bottom 16 and form the respective integral portions 48 and 50 of the bag bottom.

In view of the foregoing, it will be apparent that with the collar secured on the bag end 16 as illustrated, the unsecured bag flaps 18, 20, 22 and 24 are exposed or visible through the opening 52 defined in the upper collar segment 28 as best shown, for example, in FIGURE 2.

FIGURE 6 illustrates the vacuum cleaner filter bag 10 in operative condition within a vacuum cleaner which is not illustrated. As here shown, the collar segment 28 is uppermost so that the bag end 16 is disposed between the upper collar segment 28 and the lower collar segment 30. As the vacuum is applied to the vacuum cleaner, air will be drawn into the bag body 12 as indicated by the arrow 54 in FIGURE 6. The air will be drawn into the bag through the overlying collar openings 52 and 36 as indicated by the arrows 56 so as to distend the bag body 12 and separate or space apart the walls 44 and 46 thereof. Since the flaps at the bag end 16 are unsecured to each other, the vacuum action will cause the flaps to be drawn into the bag body so that the dust laden air can freely pass through the openings in the collar 26 and into the bag body. When it is desired to remove the filter bag 10 from the vacuum cleaner, the bag may be conveniently closed so as to prevent the inadvertent discharge of dust or debris therefrom. This may be readily accomplished by moving the collar and the bag end 16 contained therein against the bag body 12 as indicated by the arrow 56 in FIGURE 6A thereby conveniently closing the bag.

Referring now to FIGURES 7 and 8 in detail, there is illustrated a vacuum cleaner filter bag 10 provided with a bag body 12 having a rectangular collar means generally indicated by the reference numeral 26a. As here shown, the collar means 26a is formed of two similar segments 28a and 30a. It will be understood that, as in the case of the collar 26, the collar 26a is also formed of a relatively stiff sheet material preferably cardboard or paperboard. As here shown, each of the collar segments 28a and 30a is provided with an elongated hinge arm 56 which is adapted to fold upon itself along the fold line 58. It will be noted that the hinge arm 56 is constituted by two L-shaped segments 60 and 62 which are in integral relation along the fold line 58. The inner surfaces of the hinge arms 56 are provided with a suitable adhesive coating 34.

The collar 26a is secured on the bag end or bag bottom 16 by securing each of the collar segments 28a and 30a onto the bag bottom 16 so that each collar segment is engaged over two of the marginal edges of the bag bottom as shown in FIGURE 8. This is accomplished by positioning each collar segment along two adjacent marginal edges of the bag bottom and then bringing together the L-shaped segments of each collar segment about the contiguous marginal edges as indicated by the arrows 64 in FIGURE 7. The surfaces of each of the L-shaped segments is covered with the adhesive coating 34. It will be apparent that the segments will each be secured along two contiguous marginal edges of the bag bottom 16 so as to overlie the upper and lower surfaces thereof. In essence, it will be apparent that each of the hinge arms 56 forms a corner segment for the completed collar 26a so that when each of the corner segments is secured in position on the bag bottom 16 as shown in FIGURE 8, the result will be the same as having a single collar 26 formed of the previously described segments 28 and 30 in integral relation along the hinge line 32. As will be apparent from FIGURE 8, the unsecured flaps 18, 20, 22 and 24 of the bag end 16 are accessible through the upper opening 52 in the collar 26a. As a result, when the vacuum is applied to the filter bag 10, the various flaps of the bag bottom 16 will be drawn into the bag body 12 in the same manner as previously described in connection with FIGURE 6. It will be noted that the arrows 64 in FIGURE 8 indicate the manner in which each of the segments is moved onto the bag bottom 16 from the position thereof illustrated, as for example, in FIGURE 7 and it will be noted further that the arrows 66 in FIGURE 9 indicate the manner in which the opposing walls 44 and 46 of the bag body expand under the influence of the vacuum pressure. As in the case of the vacuum cleaner 10 provided with the single collar member 26, the vacuum cleaner bag illustrated in FIGURES 7, 8, 9 and 9A, which is provided with the two piece collar 26a, may be closed after use by folding the collar 26a encompassing the bag end 16 against the bag body 12 as indicated by the arrow 68 in FIGURE 9A.

Referring now to FIGURES 10 through 13 in detail, there is shown a vacuum cleaner filter bag 10 provided with a collar 26b formed of the companion collar segments 28b and 30b. Each of the segments 28b and 30b comprises a hinge arm 70 which is in the form of a pair of integral hinged U-shaped portions or segments 72 which are in integral hinged relation along a hinge line or fold line 74. The inner surfaces of each of the U-shaped segments 72 is provided with an adhesive coating 34.

In assembling the collar 28b on the bag end 16, each of the collar segments 28b and 30b is positioned on the bag end so as to encompass one of the elongated marginal portions 76 of the bag end and half of each of the shorter end portions 78 of the bag end. When both of the segments 28b and 30b is secured on the bag end 16 as shown in FIGURE 11, it will be apparent that there is defined one continuous collar 26b formed of the contiguous segments 28b and 30b which segments abut along their free marginal edges 80 and 82, as best illustrated in FIGURE 11.

As in the case of the prior collars 26 and 26a, the collar 26b also reveals the previously described unsecured flaps of the bag end 16 as best shown in FIGURE 11. Consequently, when the vacuum pressure or suction is applied to the bag provided with the collar 26b, the flaps will also move into the bag body as in the previously described embodiments. More specifically, as shown in FIGURE 12, the bag walls 44 and 46 will move apart under the suction pressure as indicated by the arrows 66 so that the bag is open and the flaps may move into the bag. Moreover, pursuant to the present modification, it will be noted that the bag may be closed when it is wished to be withdrawn from the vacuum cleaner by folding the collar along the abutting edegs 80 and 82 into the position thereof shown in FIGURE 13 whereby to conveniently close the bag and prevent the contents thereof from being inadvertently discharged.

I claim:

1. A vacuum cleaner filter bag comprising a bag body formed of air pervious sheet material, said body being closed at one end and openable at the other end, said openable end comprising a closed rectangular bottom closed by a valve defined by overlapping flaps said flaps being attached to said bag body and the collar along one edge thereof, said flaps being free of mutual securement to one another along their free edges and being movable into said bag body by vacuum pressure, and a collar means provided at said other end, said collar means having rectangular conformation and being secured along the marginal edge portions of said rectangular bottom at both of the opposite surfaces thereof, said collar means comprising a pair of collar segments consisting of a first and second segment to form a rectangular collar, the first segment overlying said other end along said peripheral edge and the second segment underlying said other end along said peripheral edge thereby defining said openable end for entry of dust laden air into said bag body, said collar segments each comprising a pair of U-shaped portions secured together along a common fold line, each portion consisting of two legs and a base member joining the legs, said base members being parallel, said U-shaped portions being in abutting relationship at the ends of the legs oposite the base members to form a center line along which said U-shaped portions are foldable.

2. A vacuum cleaner filter bag comprising a bag body formed of air pervious sheet material, said body being closed at one end and openable at the other end, said openable end comprising a closed rectangular bottom closed by a valve defined by overlapping flaps, said flaps being attached to said bag body and the collar along one edge thereof, said flaps being free of mutual securement to one another along their free edges and being movable into said bag body by vacuum pressure, and a collar means provided at said other end said collar means having rectangular conformation and being secured along the marginal edge portions of said rectangular bottom at both of the opposite surfaces thereof, said collar means comprising a pair of collar segments consisting of a first and second segment to form a rectangular collar the first segment overlying said other end along said peripheral edge and the second segment underlying said other end along said peripheral edge thereby defining said openable end for entry of dust laden air into said bag body, said collar segments each comprising an elongated hinge arm adapted to fold upon itself along a common fold line each hinge arm consisting of a pair of L-shaped portions which are in integral relation along said common fold line said L-shaped portions being in abutting relationship at the free ends thereof when said collar means are secured to said rectangular bottom.

3. A vacuum cleaner filter bag comprising a bag body formed of air pervious sheet material, said body being closed at one end and openable at the other end, said openable end comprising a closed rectangular bottom closed by a valve defined by overlapping flaps said flaps being attached to said bag body and the collar along one edge thereof, said flaps being free of mutual securement to one another along their free edges and being movable into said bag body by vacuum pressure, and a collar means provided at said other end, said collar means having rectangular conformation and being secured along the marginal edge portions of said rectangular bottom at both of the opposite surfaces thereof, said collar means comprising a pair of collar segments consisting of a first and second segment to form a rectangular collar the first segment overlying said other end along said peripheral edge and the second segment underlying said other end along said peripheral edge thereby defining said openable end for entry of dust laden air into said bag body, said collar segments each comprising a pair of U-shaped portions secured together along a common fold line, each portion consisting of two legs and a base member joining the legs, said base members being parallel, said U-shaped portions being in abutting relationship at the ends of the legs opposite the base members when said collar means are secured to said rectangular bottom.

References Cited

UNITED STATES PATENTS

| | | | |
|---|---|---|---|
| 2,070,674 | 2/1937 | Muentener | 55—367 |
| 2,390,196 | 12/1945 | Taylor | 55—378 X |
| 2,497,581 | 2/1950 | Brown | 55—378 X |
| 2,567,171 | 9/1951 | Anderson | 55—367 X |
| 2,729,303 | 1/1956 | McMahan | 55—367 X |
| 2,742,105 | 4/1956 | Dow | 55—373 X |
| 2,823,761 | 2/1958 | Duff | 55—367 X |
| 3,108,736 | 10/1963 | Anderson et al. | 55—367 X |
| 3,248,842 | 5/1966 | Peppler | 55—30 |
| 1,923,299 | 8/1933 | Darling | 55—367 |
| 1,999,826 | 4/1935 | Snell | 55—367 X |
| 2,112,304 | 3/1938 | Rhed | 15—347 X |
| 2,187,052 | 1/1940 | Poynter | 55—367 |
| 2,639,254 | 5/1953 | Smith. | |
| 2,754,928 | 7/1956 | Hambrecht et al. | |
| 2,755,883 | 7/1956 | Brace | 55—373 |
| 2,848,062 | 8/1958 | Meyerhoefer | 55—367 |
| 2,975,863 | 3/1961 | Sosnowich | 55—372 |
| 2,973,831 | 3/1961 | Sprouse et al. | |
| 3,237,846 | 3/1964 | Brown | 55—367 X |

FOREIGN PATENTS 5,471    3/1914    Great Britain.

HARRY B. THORNTON, Primary Examiner

D. E. TALBERT, Jr., Assistant Examiner

U.S. Cl. X.R.

53—36; 55—376, 378, 381; 93—35; 137—525; 229—62.5